US012466360B2

(12) United States Patent
Merz et al.

(10) Patent No.: US 12,466,360 B2
(45) Date of Patent: Nov. 11, 2025

(54) SYSTEMS AND METHODS FOR CONTROLLING VEHICLE REAR CLOSURE

(71) Applicant: Ford Global Technologies, LLC, Dearborn, MI (US)

(72) Inventors: Adam Merz, New Boston, MI (US); Kirsen J. Quan, Northville, MI (US); Ronald M. Lovasz, Allen Park, MI (US); Matthew Ryan Preston, Whitmore Lake, MI (US); Lee Mitchell Tome, Windsor (CA); Sathyanarayana Chary Palakonda, Northville, MI (US)

( * ) Notice: Subject to any disclaimer, the term of this patent is extended or adjusted under 35 U.S.C. 154(b) by 187 days.

(21) Appl. No.: 18/354,380

(22) Filed: Jul. 18, 2023

(65) Prior Publication Data

US 2025/0026306 A1    Jan. 23, 2025

(51) Int. Cl.
*B60R 25/01* (2013.01)
*B60Q 1/50* (2006.01)
*B60Q 1/54* (2006.01)
*B60Q 5/00* (2006.01)
*B60R 25/31* (2013.01)
*E05F 15/76* (2015.01)

(52) U.S. Cl.
CPC .............. *B60R 25/01* (2013.01); *B60Q 1/543* (2022.05); *B60Q 5/005* (2013.01); *E05F 15/76* (2015.01); *B60R 25/31* (2013.01); *E05Y 2900/546* (2013.01)

(58) Field of Classification Search
CPC ........ B60Q 1/543; B60Q 5/005; B60R 25/01; B60R 25/31; E05F 15/76; E05Y 2900/546
See application file for complete search history.

(56) References Cited

U.S. PATENT DOCUMENTS

| 9,162,685 | B2* | 10/2015 | Schindler | B60W 50/08 |
| 10,407,970 | B2 | 9/2019 | Lavoie et al. | |
| 10,443,294 | B2* | 10/2019 | Goldmann | E05F 15/76 |
| 10,961,768 | B2 | 3/2021 | Rrumbullaku et al. | |
| 11,080,952 | B2 | 8/2021 | Kim et al. | |
| 11,192,523 | B2 | 12/2021 | Linden et al. | |
| 11,384,589 | B2* | 7/2022 | Gunreben | E05F 15/74 |

(Continued)

OTHER PUBLICATIONS

How to Use Your Hands-Free Power Liftgate, Operation Instructions.

*Primary Examiner* — Tyler J Lee
(74) *Attorney, Agent, or Firm* — Frank Lollo; Eversheds Sutherland (US) LLP

(57) ABSTRACT

A vehicle including a rear closure, a detection unit and a notification unit is disclosed. The rear closure may move between a closed state and an open state. The detection unit may detect vehicle access device position in proximity to the vehicle. The notification unit may output visual and/or audible notifications. The vehicle may further include a processor that may determine that the vehicle access device has entered a predefined zone in proximity to a vehicle rear portion based on inputs from the detection unit. The processor may activate the notification unit to output notifications for a predefined time duration responsive to determining that the vehicle access device has entered the predefined zone. The processor may further determine a time duration the vehicle access device stays in the predefined zone. The processor may cause the rear closure to open when the time duration is greater than the predefined time duration.

14 Claims, 6 Drawing Sheets

(56) References Cited

U.S. PATENT DOCUMENTS

| | | | |
|---|---|---|---|
| 2013/0151084 A1* | 6/2013 | Lee | B60R 25/2054 |
| | | | 701/1 |
| 2015/0012176 A1* | 1/2015 | Schindler | B60R 25/2054 |
| | | | 701/36 |
| 2020/0040638 A1* | 2/2020 | Ohashi | E05F 15/73 |
| 2021/0214991 A1 | 7/2021 | Cruz et al. | |
| 2022/0316260 A1* | 10/2022 | Tao | E05F 15/73 |

* cited by examiner

SYSTEMS AND METHODS FOR CONTROLLING VEHICLE REAR CLOSURE

FIELD

The present disclosure relates to systems and methods for controlling a vehicle rear closure and more particularly to systems and methods for moving the vehicle rear closure from a closed state to an open state based on presence of a vehicle access device in proximity to the vehicle rear closure.

BACKGROUND

Many modern vehicles enable hands-free opening of vehicle rear closures. For example, a user may cause a rear closure to automatically open based on a predefined gesture, e.g., waving of hands. In such vehicles, the user may not be required to manually open the rear closure.

While hands-free opening of the rear closure may be beneficial for the user, especially when the user's hands may be pre-occupied (e.g., carrying one or more objects), there may be instances when the vehicle feature of hands-free rear closure opening may not activate. For example, if the user performs an incorrect gesture or the vehicle is not able to correctly read the gesture, the vehicle feature may not activate. This may cause inconvenience to the user.

Thus, a system is desired that may activate the rear closure in the opening direction, when the user intends to open the rear closure.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
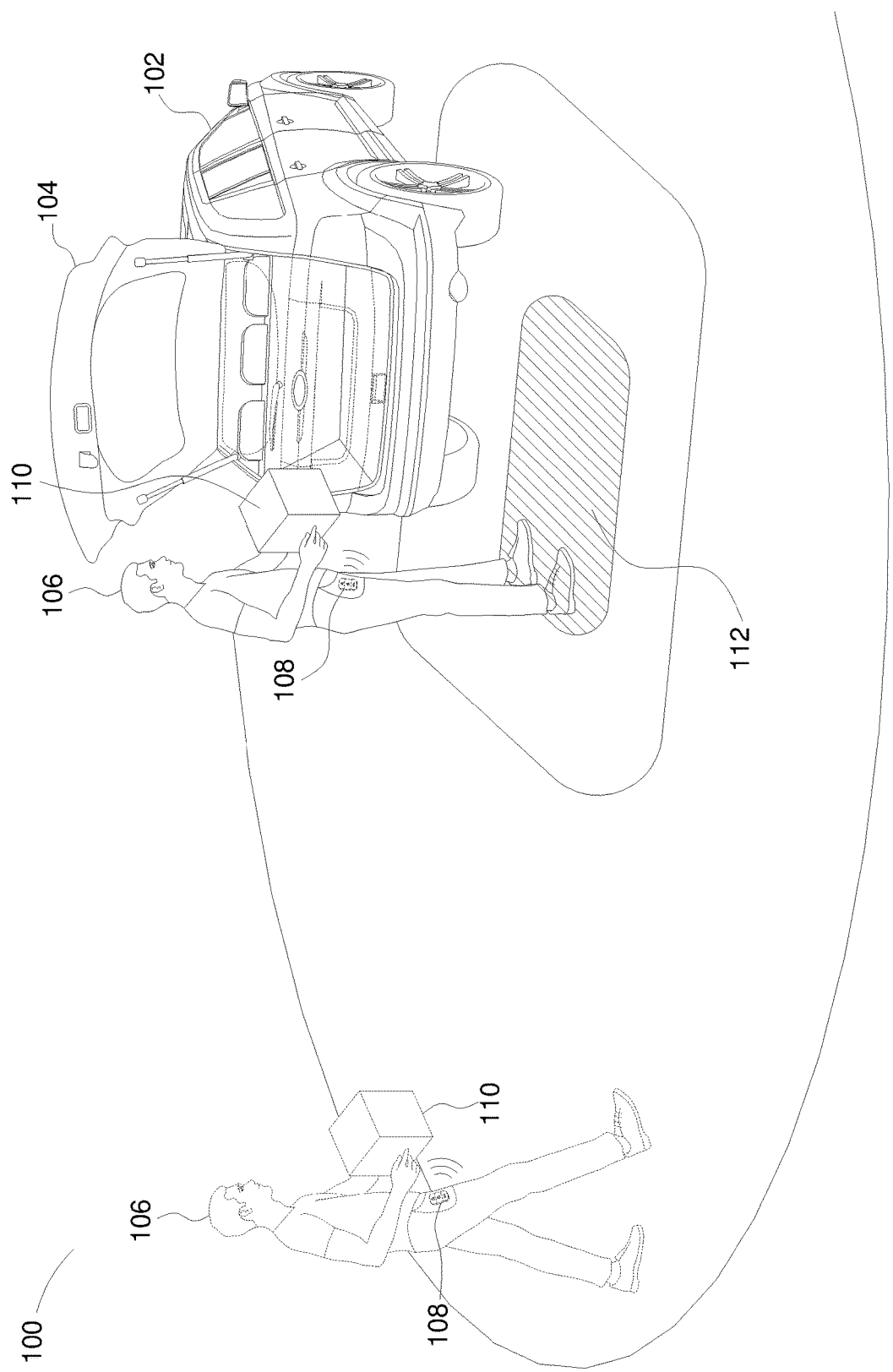
FIG. 1 depicts an example environment in which techniques and structures for providing the systems and methods disclosed herein may be implemented.

The present disclosure describes a vehicle having a rear closure that may be configured to move from a closed state to an open state when a vehicle access device, e.g., a key fob, may be present in a predefined zone in proximity to the rear closure for more than a predefined time duration. The vehicle may be configured to determine when a user having the key fob enters the predefined zone. Responsive to determining that the key fob may have entered the predefined zone, the vehicle may output a set of notifications via vehicle exterior light(s) and/or vehicle speaker(s). In some aspects, the vehicle may output the set of notifications for a first predefined time duration and in a specific first pattern (e.g., at a specific frequency rate). The set of notifications may provide an indication to the user that the vehicle has initiated an automated rear closure opening process.

In addition, the vehicle may monitor a time duration the key fob stays motionless (or with minimal motion) in the predefined zone. Responsive to determining that the key fob may have stayed in the predefined zone for the first predefined time duration, the vehicle may output another set of notifications via the vehicle exterior light(s) and/or the vehicle speaker(s). The vehicle may output another set of notifications for a second predefined time duration and in a second pattern (that may be different from the first pattern). The other set of notifications may provide an indication to the user that the vehicle is about to open the rear closure. The vehicle may automatically open the rear closure when the second predefined time duration lapses.

In some aspects, the vehicle may output the other set of notifications a predefined pause time duration after the first predefined time duration lapses. In further aspects, before initiating the automated rear closure opening process, the vehicle may first check whether a plurality of predefined vehicle conditions are met. The vehicle may initiate the automated rear closure opening process when the plurality of predefined vehicle conditions may be met, and may not initiate the automated rear closure opening process when one or more predefined vehicle conditions may not be met.

In an exemplary aspect, the predefined vehicle conditions may include, but are not limited to, the vehicle being parked, vehicle movement being less than a predefined movement threshold, a vehicle run-start bus being in off state, the rear closure being in the closed state, the vehicle being in locked state, the vehicle being in a normal operating mode, a vehicle battery state of charge being greater than a predefined battery level threshold, a power rear closure feature being enabled and an automatic rear closure control mode being enabled on the vehicle.

In some aspects, when the user does not desire the rear closure to open, the user may perform one or more actions to cause the vehicle abort the automated rear closure opening process. For example, the user (having the key fob) may walk away from the predefined zone before the first predefined time duration lapses or the user may unlock the vehicle to abort the automated rear closure opening process.

The present disclosure discloses a vehicle that may automatically open the rear closure when the user having the key fob may be located in the predefined zone for more than the first predefined time duration. The present disclosure provides a hands-free rear closure opening feature to the user, thereby enhancing user convenience. Further, the vehicle outputs one or more notifications before opening the rear closure, thereby providing indications to the user that the rear closure is about to open. If the user does not desire the rear closure to open, the user may walk away from the predefined zone or unlock the vehicle. Therefore, by outputting the notifications, the vehicle reduces the potential that the rear closure opens when the user does not intend or desire the rear closure to open. Furthermore, the vehicle performs the automated rear closure opening process by using existing vehicle components and does not require use of any external or new components/hardware.

These and other features of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may take the form of any passenger or commercial vehicle such as, for example, a car, a work vehicle, a crossover vehicle, a truck, a van, a minivan, a taxi, a bus, etc. The vehicle 102 may be a manually driven vehicle, and/or may be configured to operate in a partially autonomous mode, and may include any powertrain such as, for example, a gasoline engine, one or more electrically-actuated motor(s), a hybrid system, etc.

The vehicle 102 may include a rear closure 104 that may be configured to move between a close state and an open state. The rear closure 104 may provide access to a vehicle interior portion or vehicle trunk to a user when the rear closure 104 may be in the open state. In some aspects, the vehicle 102 may enable automatic or hands-free opening of the rear closure 104 when a user having a vehicle access device, e.g., a key fob, a wearable device, Phone as a Key (PaaK), etc. may be located at a position in proximity to a vehicle rear portion, as described below. In some aspects, the vehicle access device may be any communication device using which a vehicle user may access one or more features of the vehicle 102 by using one or more wireless communication protocols such as Bluetooth®, BLE®, Ultra-Wideband (UWB), Wi-Fi, near-field-communications (NFC), Radio-Frequency Identification (RFID), and/or the like. Hereinafter, the vehicle access device is referred to as a key fob; however, the present disclosure is not limited to usage of key fob and any other vehicle access device may be used without departing from the scope of the present disclosure.

As depicted in FIG. 1, the environment 100 may further include a user 106 who may be approaching the vehicle 102 towards the vehicle rear portion. The user 106 may be carrying a vehicle access device, such as a key fob 108, for illustrative purposes. In the exemplary aspect shown in FIG. 1, the user's hands are pre-occupied (e.g., the user 106 is carrying a box 110), although the present disclosure is not limited to the user's hands being pre-occupied.

The vehicle 102 and the key fob 108 may be communicatively coupled with each other, and the vehicle 102 may be configured to determine a key fob location in proximity to the vehicle 102. By determining the key fob location in proximity to the vehicle 102, the vehicle 102 may determine whether the user 106 may have reached in proximity to the vehicle rear portion (specifically a predefined zone 112 in proximity to the rear closure 104). Responsive to determining that the user 106 (specifically, the key fob 108) may have reached the predefined zone 112, the vehicle 102 may initiate an automated rear closure opening process.

Specifically, responsive to determining that the user 106 may have entered the predefined zone 112, the vehicle 102 may activate vehicle exterior light(s) and/or speaker(s) (e.g., also referred to as the vehicle audio system) in a first predefined pattern to provide a notification/indication to the user 106 that the vehicle 102 has initiated the automated rear closure opening process. In some aspects, the vehicle 102 may cause the vehicle exterior lights and/or the vehicle audio system to stay activated in the first predefined pattern for a first predefined time duration (e.g., 2.2-2.8 seconds). The user 106 may view/hear the notification output from the vehicle exterior lights and/or the vehicle audio system, and may move away from the predefined zone 112 within the first predefined time duration if the user 106 does not intend the rear closure 104 to open. In this manner, the present disclosure reduces the potential for unintended opening of the rear closure 104, by providing visual and/or audible notifications to the user 106 indicating that the rear closure 104 may be opening.

If the user 106 intends the rear closure 104 to open, the user 106 may stay in the predefined zone 112 motionless (or without substantial movement) for the first predefined time duration. Responsive to determining that the user 106 has stayed motionless in the predefined zone 112 for the first predefined time duration, the vehicle 102 may cause the vehicle exterior lights and/or vehicle audio system to output another notification in a second predefined pattern for a second time duration (e.g., 1 to 1.5 seconds). The notification in the second predefined pattern may provide an indication to the user 106 that the vehicle 102 is about to open the rear closure 104. The vehicle 102 may automatically open the rear closure 104 when the second time duration lapses. In this manner, the vehicle 102 enables automatic opening of the rear closure 104 based on a determination that the key fob 108 (and hence the user 106) may be in proximity to the rear closure 104 and the user 106 intends the rear closure 104 to open. The vehicle 102 provides notifications to the user 106 before opening the rear closure 104, thus reducing the potential for unintended rear closure opening.

Although the description above describes an aspect where the vehicle 102 initiates the automated rear closure opening process when the key fob 108 reaches the predefined zone 112, in some aspects, the vehicle 102 may first determine whether one or more predefined vehicle conditions are met before initiating the automated rear closure opening process. The vehicle 102 may initiate the automated rear closure opening process when the predefined vehicle conditions may be met, and not initiate the process when one or more predefined vehicle conditions may not be met. In an exemplary aspect, the predefined vehicle conditions may include, but are not limited to, the vehicle 102 being parked, vehicle movement being less than a predefined movement threshold, a vehicle run-start bus being in off state, the rear closure 104 being in the closed state, the vehicle 102 being in locked state, the vehicle 102 being in a normal operating mode, a vehicle battery state of charge being greater than a predefined battery level threshold, a power rear closure feature being enabled and an automatic rear closure control mode being enabled on the vehicle 102.

Responsive to determining that one or more predefined vehicle conditions, as described above, may not be met, the vehicle 102 may not initiate the automated rear closure opening process even when the key fob 108 may be located in the predefined zone 112. Furthermore, even after imitating the automated rear closure opening process, if the user 106 changes an operating condition of the vehicle 102 (e.g., unlocks the vehicle 102), the vehicle 102 may stop the automated rear closure opening process. For example, when the user 106 may be located in the predefined zone 112 but may not desire the rear closure 104 to open, the user 106 may unlock the vehicle 102, thereby causing the vehicle 102 to stop the automated rear closure opening process and reduces the potential for the rear closure 104 from opening.

Further details of the vehicle 102 are described below in conjunction with FIG. 2.

The vehicle 102 and/or the user 106 implement and/or perform operations, as described here in the present disclosure, in accordance with the owner manual and safety guidelines.

Figure 2:
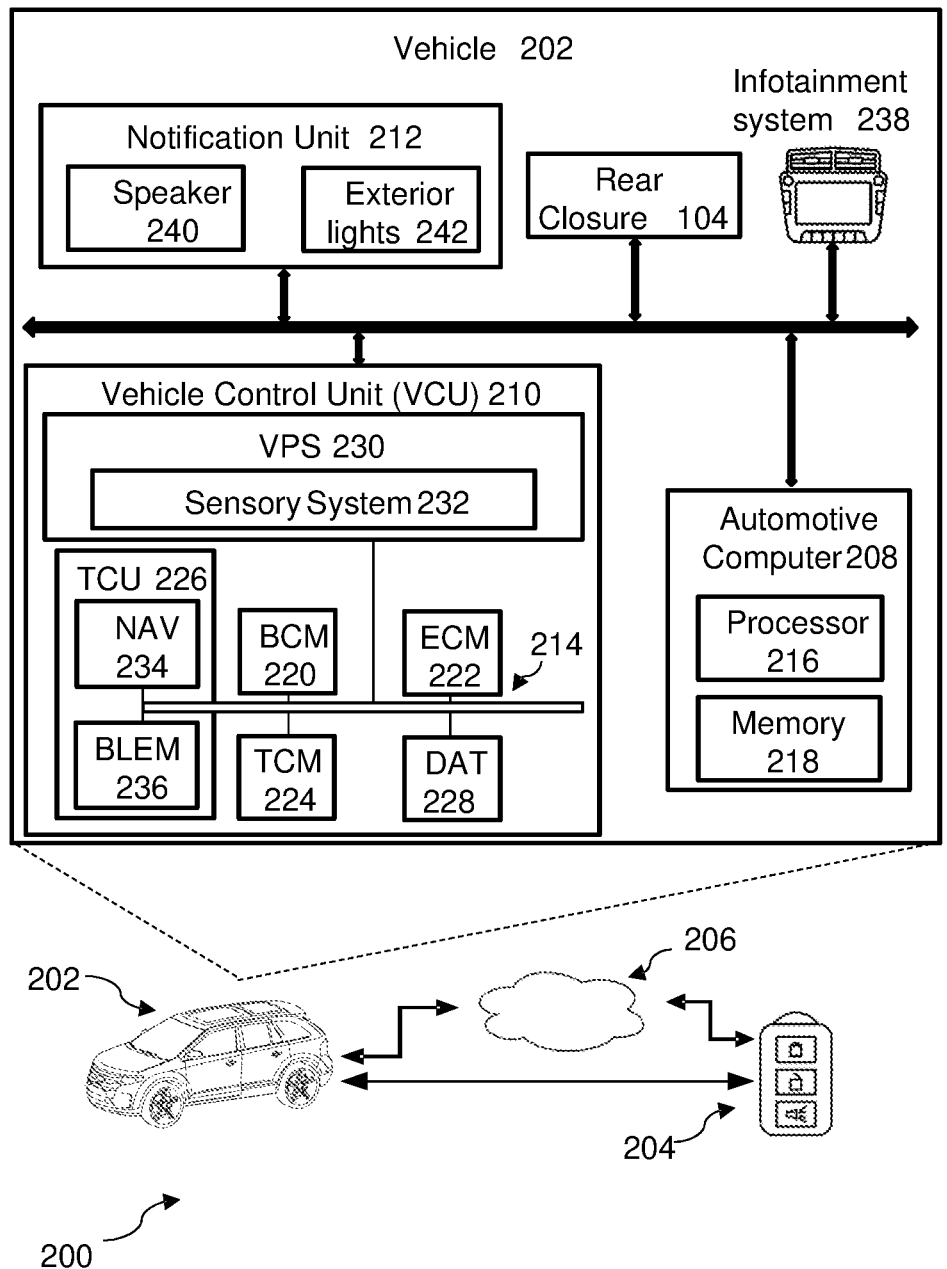
FIG. 2 depicts a block diagram of an example system for controlling operation of a vehicle rear closure in accordance with the present disclosure.

FIG. 2 depicts a block diagram of an example system 200 for controlling operation of a vehicle rear closure (e.g., the rear closure 104) in accordance with the present disclosure. While describing FIG. 2, references may be made to FIGS. 3-5.

The system 200 may include a vehicle 202 and a key fob 204 (or any other vehicle access device, as described above) communicatively coupled with each other directly or via networks 206. The vehicle 202 may be same as the vehicle 102, and the key fob 204 may be same as the key fob 108 described above in conjunction with FIG. 1. Examples of the communication protocols that may be used to facilitate communication between the vehicle 202 and key fob 204 (i.e., the vehicle access device) may include, but are not limited to, Bluetooth®, BLE®, Ultra-Wideband (UWB), Wi-Fi, Zigbee®, near-field-communications (NFC), and/or the like.

The vehicle 202 may include a plurality of units including, but not limited to, an automotive computer 208, a Vehicle Control Unit (VCU) 210, and a notification unit 212. The VCU 210 may include a plurality of Electronic Control Units (ECUs) 214 disposed in communication with the automotive computer 208.

In some aspects, the automotive computer 208 may be installed in a vehicle engine compartment (or elsewhere in the vehicle 202), in accordance with the disclosure. The automotive computer 208 may be or include an electronic vehicle controller, having one or more processor(s) 216 and a memory 218.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable memory storing a rear closure control program code. The memory 218 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle systems, connected servers (not shown), and other vehicles (not shown) operating as part of a vehicle fleet. The VCU 210 can include or communicate with any combination of the ECUs 214, such as, for example, a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, wheel sensors, ambient weather sensors, vehicle interior and exterior cameras, steering wheel sensors, etc.

In some aspects, the VCU 210 may control vehicle operational aspects and implement one or more instruction sets stored in the memory 218.

The TCU 226 may be configured and/or programmed to provide vehicle connectivity to wireless computing systems onboard and off board the vehicle 202, and may include a Navigation (NAV) receiver 234 for receiving and processing a GPS signal, a BLE® Module (BLEM) 236, a Wi-Fi transceiver, a UWB transceiver, Low-frequency antennas, remote tuner module (RTM) antennas, and/or other wireless transceivers/antennas (not shown in FIG. 2) that may be configurable for wireless communication (including cellular communication) between the vehicle 202 and other systems (e.g., the key fob 204), computers, and modules. The TCU 226 may be disposed in communication with the ECUs 214 by way of a bus.

The ECUs 214 may control aspects of vehicle operation and communication using inputs from human drivers, inputs from an autonomous vehicle controller, and/or via wireless signal inputs received via the wireless connection(s) from other connected devices, such as user devices, servers (not shown), among others.

The BCM 220 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, wipers, door locks and access control, and various comfort controls. The BCM 220 may also operate as a gateway for bus and network interfaces to interact with remote ECUs (not shown in FIG. 2). In some aspects, the BCM 220 may additionally control or perform functions of a Passive Entry Passive Start (PEPS) system, in which the BCM 220 may act as a location detection unit to determine and monitor location of the key fob 204 by using signals transmitted to and received from the key fob 204 via the TCU 226. The process of determining and monitoring key fob location is described later below in conjunction with FIGS. 3 and 4.

The DAT controller 228 may provide Level-1 through Level-3 automated driving and driver assistance functionality that can include, for example, active parking assistance, vehicle backup assistance, adaptive cruise control, and/or lane keeping, among other features. The DAT controller 228 may also provide aspects of user and environmental inputs usable for user authentication.

In some aspects, the automotive computer 208 may connect with an infotainment system 238. The infotainment system 238 may include a touchscreen interface portion, and may include voice recognition features, biometric identification capabilities that can identify users based on facial recognition, voice recognition, fingerprint identification, or other biological identification means. In other aspects, the infotainment system 238 may be further configured to receive user instructions via the touchscreen interface portion, and/or display notifications (including visual alert notifications), navigation maps, etc. on the touchscreen interface portion.

The vehicle 202 may further include the notification unit 212, as described above. The notification unit 212 may include one or components including, but not limited to, an audio system or a speaker 240 and exterior lights 242.

The computing system architecture of the automotive computer 208 and the VCU 210 may omit certain computing modules. It should be readily understood that the computing environment depicted in FIG. 2 is an example of a possible implementation according to the present disclosure, and thus, it should not be considered limiting or exclusive.

In some aspects, the BCM 220 may perform some or all of the functions performed by the processor 216. The processor 216 may be part of the BCM 220 or may be separate from the BCM 220 (as depicted in FIG. 2). Hereinafter, the functions performed by the processor 216 are considered to be performed by the BCM 220.

In operation, the user 106 may enable the power rear closure feature and the automatic rear closure control mode of the vehicle 202 when the user 106 desires the vehicle 202 to automatically open the rear closure 104 whenever the key fob 204 may be located in proximity to the rear closure 104 for more than a predefined time duration (as described above in conjunction with FIG. 1). The user 106 may enable the power rear closure feature and the automatic rear closure control mode by providing inputs on the infotainment system 238 or via a user device (not shown).

In addition to enabling the power rear closure feature and the automatic rear closure control mode, the user 106 may enable (or disable) a feature of receiving audible notifications via the speaker 240, when the key fob 204 may be in proximity to the rear closure 104. Enablement or disablement of the audible notification feature may enable the vehicle 202 to determine whether the user 106 desires to hear audible notifications or not, when the vehicle 202 initiates the automated rear closure opening process or when the rear closure 104 is about to open. The user 106 may enable/disable the audible notification feature by providing inputs on the infotainment system 238 or via the user device.

Responsive to the user 106 enabling the power rear closure feature and the automatic rear closure control mode, and enabling or disabling the audible notification feature, the BCM 220 may check whether the predefined vehicle conditions may be met. Examples of the predefined vehicle conditions are already described above in conjunction with FIG. 1. The BCM 220 may not initiate the automated rear closure opening process when one or more predefined vehicle conditions may not be met. On the other hand, the BCM 220 may initiate the automated rear closure opening process when the predefined vehicle conditions may be met, as described in conjunction with FIG. 1.

In some aspects, before initiating the automated rear closure opening process, the BCM 220 may "hand-shake" with the key fob 204 to authenticate the key fob 204 and determine the key fob location in proximity to the vehicle 202 (i.e., the BCM 220 may act as a key fob location detection unit). The process of authenticating the key fob 204 and determining the key fob location is described below in conjunction with FIGS. 3 and 4.

Figure 3:
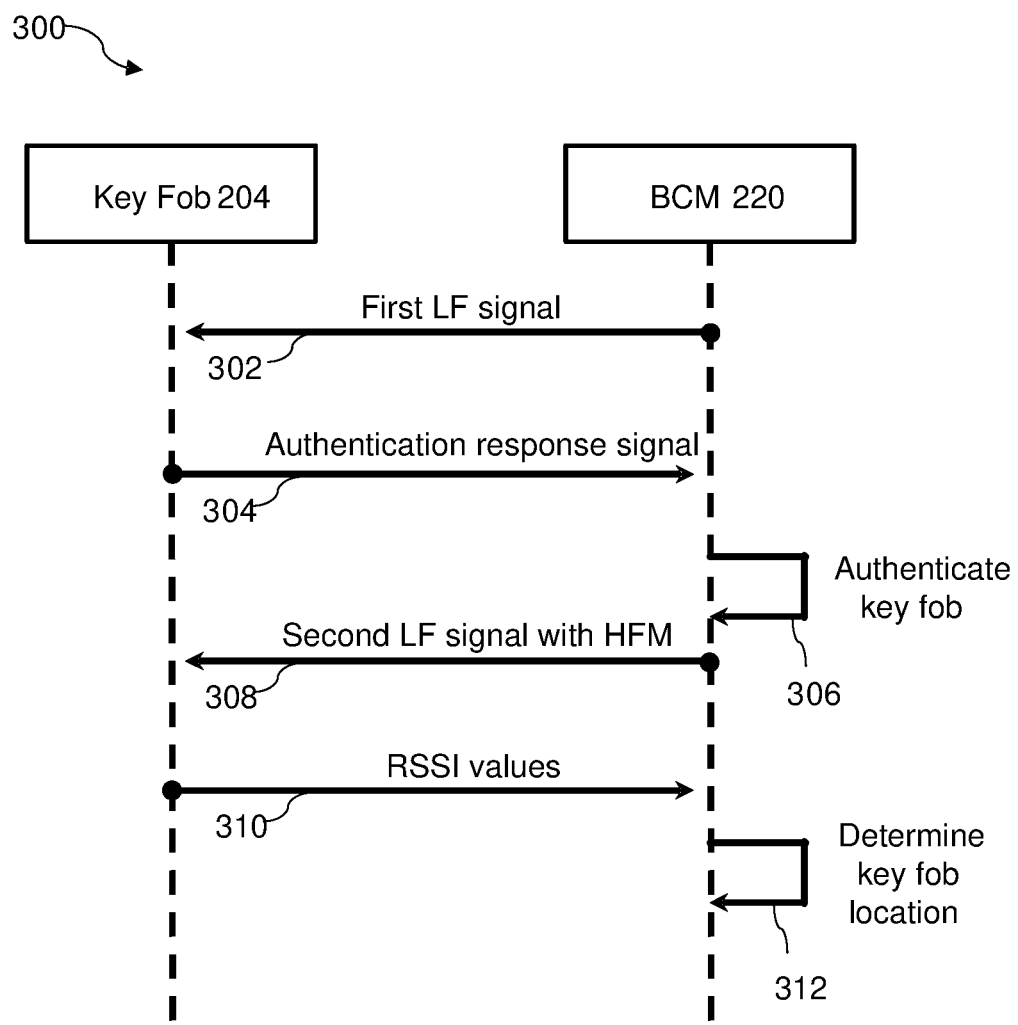
FIG. 3 depicts an example signal-timing diagram of communication between a key fob and a vehicle body control module in accordance with the present disclosure.

FIG. 3 depicts an example signal timing diagram 300 illustrating communication between the key fob 204 and BCM 220 in accordance with the present disclosure. At step 302, the BCM 220 may transmit, via the TCU 226 on a first frequency band, a first low frequency (LF) signal/message to the key fob 204. In some aspects, the BCM 220 may transmit the first LF signal at a first predefined polling or frequency rate, which may be, e.g., every 700 ms. The first LF signal may include a unique authentication message for the vehicle 202.

When the key fob 204 may be within a predefined range of or in proximity to the vehicle 202, the key fob 204 may receive the first LF signal. Responsive to receiving the first LF signal, at step 304, the key fob 204 may transmit, on a second frequency band, an authentication response signal including an authentication key or message. The BCM 220 may receive, via the TCU 226, the authentication response signal and may authenticate the key fob 204 (i.e., perform "hand-shake") based on the authentication key at step 306. Specifically, the BCM 220 may correlate the unique authentication message sent by the BCM 220 in the first LF signal with the authentication key received from the key fob 204 to authenticate the key fob 204.

Responsive to authenticating the key fob 204, at step 308, the BCM 220 may transmit, via the TCU 226, a second LF signal to the key fob 204. In some aspects, the second LF signal may include an LF message with "high for measure" (HFM).

The key fob 204 may receive the second LF signal and may transmit Received Signal Strength Indicator (RSSI) values responsive to receiving the second LF signal at step 310. The BCM 220 may receive, via the TCU 226, the RSSI values and may determine the key fob location based on the RSSI values at step 312.

In some aspects, the BCM 220 may continue to transmit the second LF signals to the key fob 204 for a predefined time duration (e.g., 120-180 seconds) at different polling or frequency rates based on a distance between the key fob 204 and the vehicle 202. Similarly, the key fob 204 may continue to transmit RSSI values to the BCM 220 in response to receiving the second LF signals, which may assist the BCM 220 in monitoring/tracking the key fob location in proximity to the vehicle 202.

Figure 4:
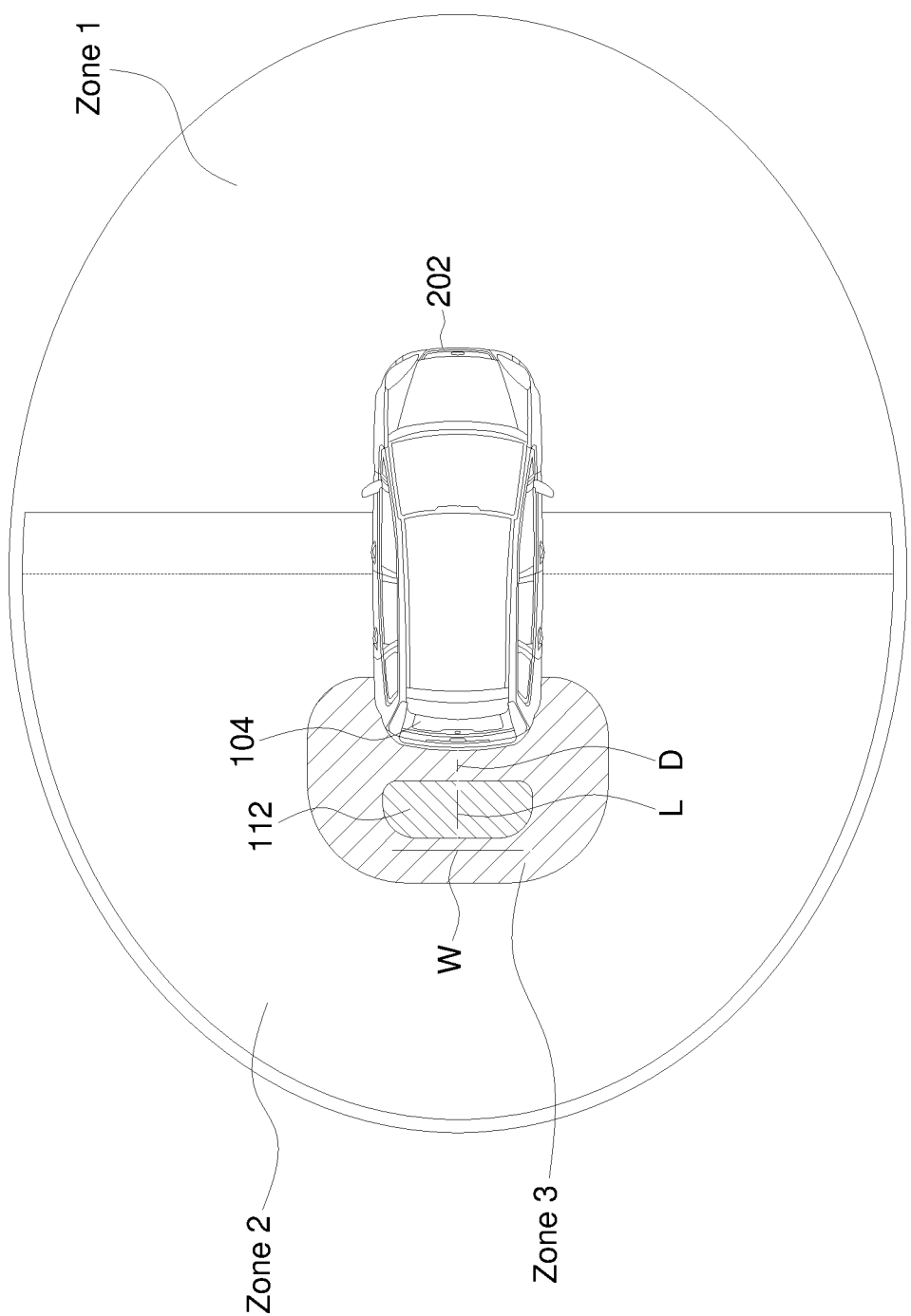
FIG. 4 depicts example zones around a vehicle in accordance with the present disclosure.

As an example, referring to FIG. 4, the BCM 220 may transmit the second LF signals every two seconds when the key fob 204 may be in Zone 1 around the vehicle 202 (determined by using the RSSI values transmitted by the key fob 204). In an exemplary aspect, Zone 1 may be a circle with a radius of five to seven meters and center at the vehicle 202. The BCM 220 may increase second LF signal transmission frequency rate to transmitting the signal every one second when the key fob 204 may be in Zone 2. Zone 2 may be four to six meters around the predefined zone 112. The BCM 220 may further increase the second LF signal transmission frequency rate to transmitting the signal every 0.7 seconds when the key fob 204 may be in Zone 3. Zone 3 may be an arc with a radius of two to three meters, with a center at the rear closure 104.

The predefined zone 112 may be a part of Zone 3, and the predefined zone 112 may disposed at a predefined distance "D" (e.g., a "Null" zone) from the vehicle rear portion/rear closure 104, as shown in FIG. 4. A predefined zone width "W" may be equivalent to the vehicle width and a predefined zone length "L" may be in a range of 0.6 to 1 meter.

The measurements and frequency/polling rates described above are exemplary in nature and for illustrative purposes. The present disclosure is not limited to the measurements and frequency/polling rates described above.

The BCM 220 may determine when the key fob 204 enters the predefined zone 112 based on the RSSI values received from the key fob 204. Responsive to determining that the key fob 204 may have entered the predefined zone 112, the BCM 220 may start a system timer or a BCM timer (not shown). The BCM 220 may continue to measure a time duration, via the BCM timer, for which the key fob 204 stays motionless (or with minimal motion) in the predefined zone 112.

Figure 5:
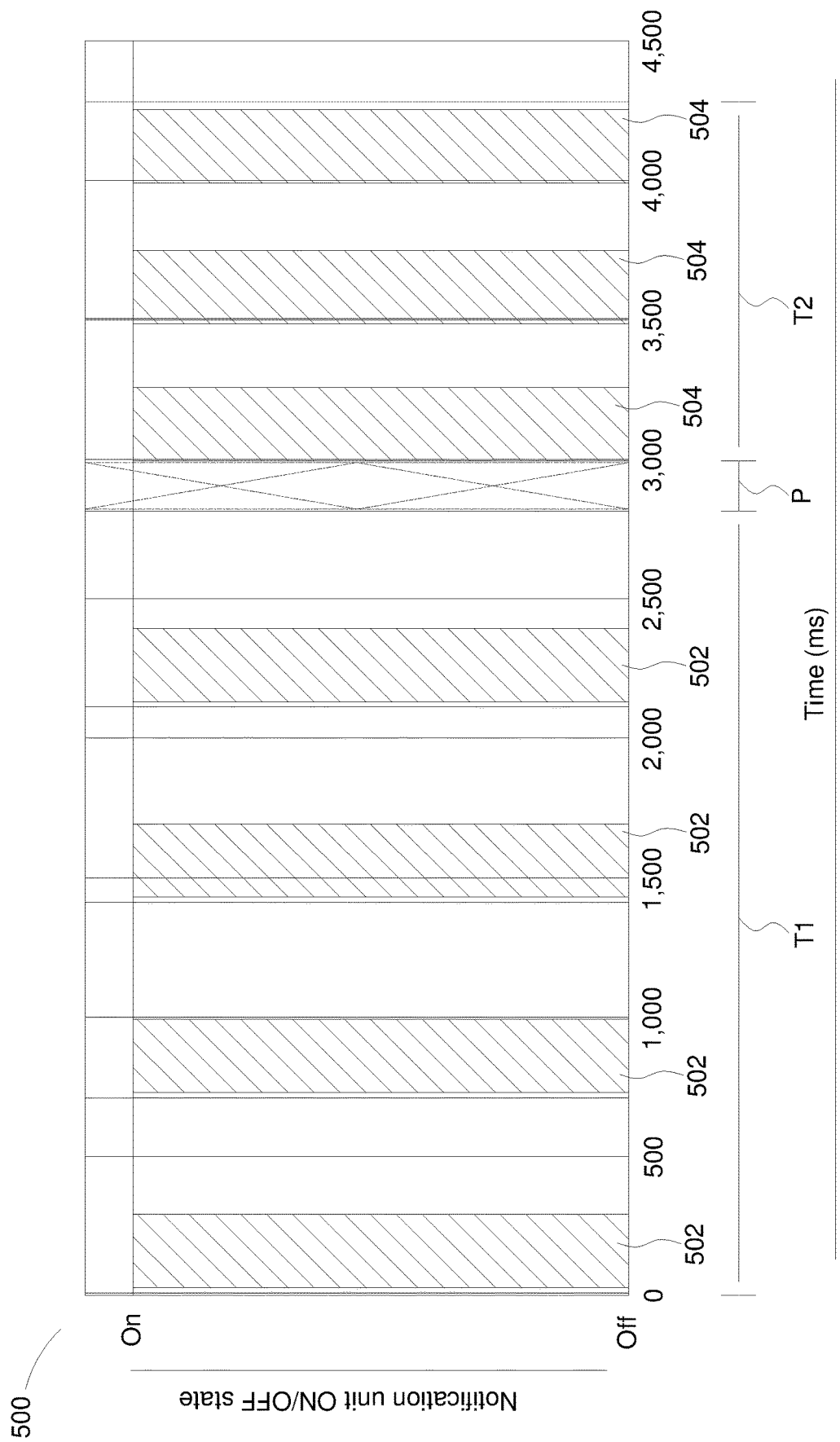
FIG. 5 depicts an example graph illustrating actuation of a vehicle notification unit in accordance with the present disclosure.

In addition, responsive to determining that the key fob 204 may have entered the predefined zone 112, the BCM 220 may activate the notification unit 212 to output a first set of notifications 502 (as shown in graph 500 of FIG. 5) for a first predefined time duration "T1". For example, the BCM 220 may cause the exterior lights 242 to blink and the speaker 240 to output audio notifications (e.g., when the user 106 desires to receive audible notifications) when the BCM 220 determines that the key fob 204 may have entered the predefined zone 112. In some aspects, as shown in FIG. 5, the BCM 220 may cause the notification unit 212 to output the first set of notifications 502 at a predefined frequency rate, e.g., a first predefined frequency. In an exemplary aspect, the first predefined frequency may be equivalent to (or same as) as the polling or frequency rate at which the BCM 220 transmits the second LF signals to the key fob 204. Stated another way, the BCM 220 may cause the notification unit 212 to output visual and/or audible notifications in pulses every 0.7 seconds, which is the polling or frequency rate at which the BCM 220 transmits the second LF signals to the key fob 204. Further, each notification pulse of the first set of notifications 502 may have a width in a range of 200-300 ms (e.g., 250 ms).

As described above in conjunction with FIG. 1, the first set of notifications 502 may provide an indication to the user 106 that the BCM 220 has initiated the automated rear closure opening process. In some aspects, the first set of notifications 502 may include four notifications or pulses, as shown in the graph 500. Stated another way, within the first predefined time duration "T1", the notification unit 212 may output four notifications. If the user 106 does not desire the rear closure 104 to open, the user 106 may perform one or more actions within the first predefined time duration "T1" to abort the automated rear closure opening process. For example, the user 106 may move away from the predefined zone 112 before the first predefined time duration "T1" lapses to reset the BCM timer and abort the automated rear closure opening process. In this case, the BCM 220 may deactivate the notification unit 212 and abort the automated rear closure opening process when the user 106 moves away from the predefined zone 112 before the first predefined time duration "T1" lapses.

As another example, the user 106 may unlock the vehicle 202, thereby ensuring that the predefined vehicle conditions are not met. As described above, the BCM 220 initiates the automated rear closure opening process (i.e., activates the notification unit 212) when the BCM 220 determines that the predefined vehicle conditions are met. When the user 106 unlocks the vehicle 202, the BCM 220 may determine that the predefined vehicle conditions are not met, and may hence abort the automated rear closure opening process.

In additional aspects, the BCM 220 may reset the BCM timer, deactivate the notification unit 212, and abort the automated rear closure opening process when the key fob 204 may be moving within the predefined zone 112 (as determined by the BCM 220 using the RSSI values transmitted by the key fob 204) before the first predefined time duration "T1" lapses.

On the other hand, if the user 106 stays in the predefined zone 112 for the first predefined time duration "T1" (i.e., the key fob 204 does not move), the BCM 220 may determine that the user 106 may desire the rear closure 104 to open. Responsive to determining that the first predefined time duration "T1" has lapsed (via the BCM timer) and the key fob 204 has not moved within or from the predefined zone 112, the BCM 220 may cause the notification unit 212 to output a second set of notifications 504 for a second predefined time duration "T2". In some aspects, the BCM 220 may cause the notification unit 212 to output the second set of notifications 504 at a second predefined frequency. In an exemplary aspect, the second predefined frequency may be greater than the first predefined frequency. For example, the notification unit 212 may output the second set of notifications 504 in pulses every 0.4 seconds (or 400 ms). Further, the second set of notifications 504 may include three notifications or pulses, as shown in the graph 500. Furthermore, each notification pulse of the second set of notifications 504 may have a width in a range of 200-300 ms (e.g., 250 ms).

The second set of notifications 504 may provide an indication to the user 106 that the BCM 220 is about to open the rear closure 104. In some aspects, the BCM 220 may cause the notification unit 212 to output the second set of notifications 504 a predefined pause time duration "P" after the first predefined time duration "T1" lapses. Stated another way, the second predefined time duration "T2" begins a predefined pause time duration "P" after the first predefined time duration "T1" lapses. In some aspects, the predefined pause time duration "P" may be in a range of 100-200 ms (e.g., 150 ms).

The BCM 220 may cause the rear closure 104 to move from the closed state to the open state when the second predefined time duration "T2" lapses. Stated another way, the BCM 220 may cause the rear closure 104 to open when the notification unit 212 finishes outputting the second set of notifications 504. In this manner, the present disclosure provides hands-free rear closure opening feature to the user 106.

Figure 6:
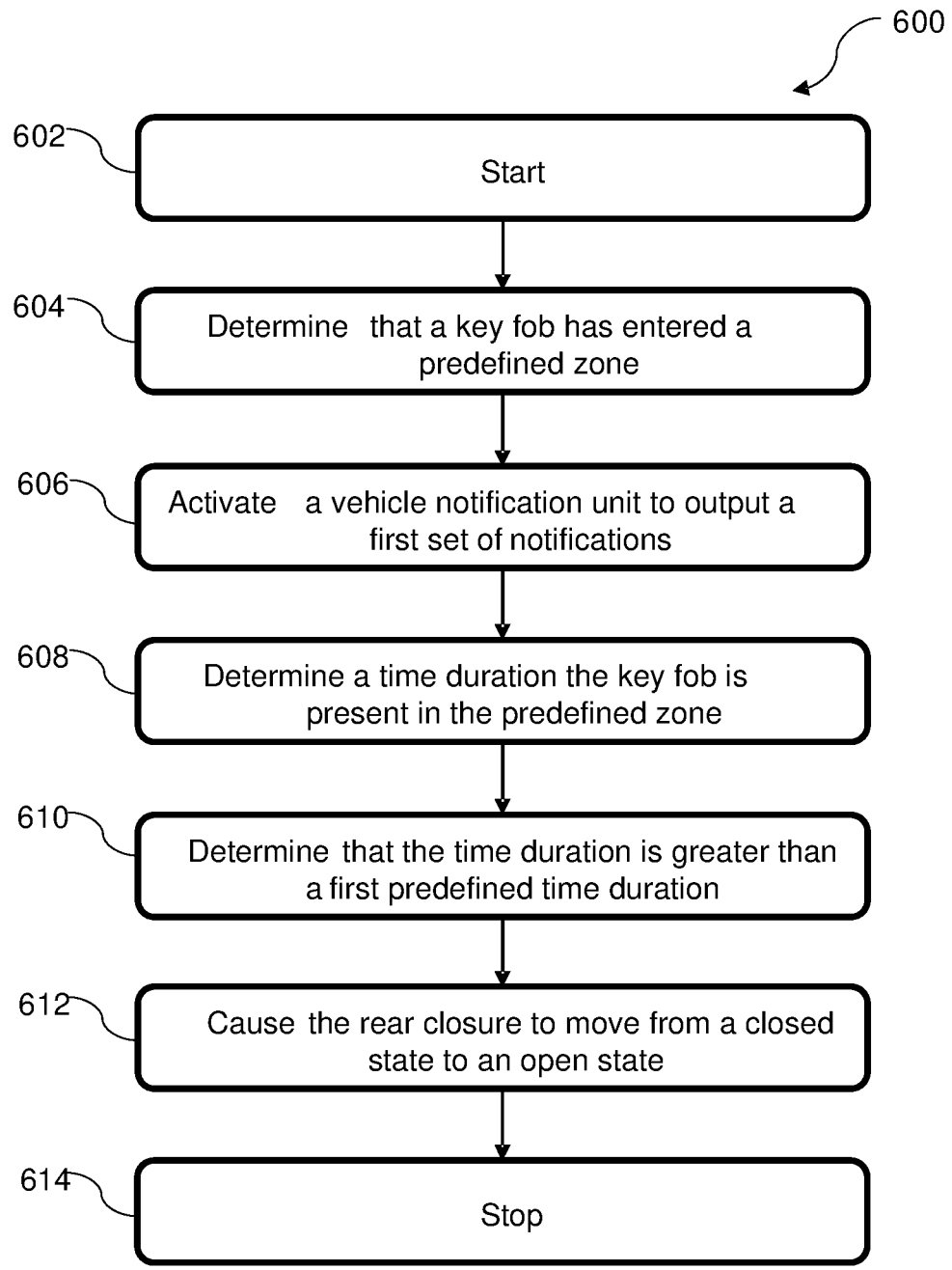
FIG. 6 depicts a flow diagram of an example method for controlling operation of a vehicle rear closure in accordance with the present disclosure.

FIG. 6 depicts a flow diagram of an example method 600 for controlling operation of the rear closure 104 in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include determining, by the BCM 220, that the key fob 204 has entered the predefined zone 112. At step 606, the method 600 may include activating, by the BCM 220, the notification unit 212 to output the first set of notifications 505 for the first predefined time duration "T1" responsive to a determination that the key fob 204 has entered the predefined zone 112.

At step 608, the method 600 may include determining, by the BCM 220, a time duration the key fob 204 may be present or may stay motionless in the predefined zone 112, as described above. At step 610, the method 600 may include determining, by the BCM 220, that the time duration is greater than the first predefined time duration "T1". Responsive to determining that the time duration is greater than the first predefined time duration "T1", the BCM 220 may activate the notification unit 212 to output the second set of notifications 504 for the second predefined time duration "T2" (after a predefined pause time duration "P"), as described above.

At step 612, the method 600 may include causing, by the BCM 220, the rear closure 104 to move from the close state to the open state when the second predefined time duration "T2" lapses.

The method 600 may end at step 614.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a rear closure configured to move between a closed state and an open state;
   a detection unit configured to detect a location of a vehicle access device in proximity to the vehicle;
   a notification unit configured to output at least one of visual or audible notifications; and
   a processor communicatively coupled with the rear closure, the detection unit and the notification unit, wherein the processor is configured to:
   determine that the vehicle access device has entered a predefined zone in proximity to a vehicle rear portion based on inputs obtained from the detection unit;
   activate the notification unit to output a first set of notifications for a first predefined time duration and at a first frequency responsive to a determination that the vehicle access device has entered the predefined zone;
   determine a time duration the vehicle access device is present in the predefined zone;
   determine that the time duration is greater than the first predefined time duration;
   activate the notification unit to output a second set of notifications at a second frequency for a second predefined time duration responsive to the determination that the time duration is greater than the first predefined time duration, the second predefined time duration including a third predefined time duration after the first predefined time duration lapses; and
   cause the rear closure to move from the closed state to the open state responsive to a determination that the second predefined time duration has lapsed.

2. The vehicle of claim 1, wherein the detection unit is further configured to:
   transmit a first low frequency message to the vehicle access device;
   receive an authentication message from the vehicle access device, responsive to transmitting the first low frequency message;
   authenticate the vehicle access device based on the authentication message;

transmit a second low frequency message to the vehicle access device at a third frequency, responsive to authenticating the vehicle access device;
receive a Received Signal Strength Indicator (RSSI) value from the vehicle access device; and
detect a position of the vehicle access device based on the RSSI value.

3. The vehicle of claim 2, wherein the first frequency is equivalent to the third frequency.

4. The vehicle of claim 1, wherein the processor is further configured to determine that a predefined vehicle condition is met, and wherein the processor activates the notification unit to output the first set of notifications when the predefined vehicle condition is met.

5. The vehicle of claim 4, wherein the predefined vehicle condition comprises at least one of: a vehicle being parked, vehicle movement being less than a predefined movement threshold, the rear closure being in the closed state, the vehicle being in locked state, a vehicle battery state of charge being greater than a predefined battery level threshold and an automatic rear closure control mode being enabled.

6. The vehicle of claim 1, wherein the predefined zone is disposed at a predefined distance away from the vehicle rear portion.

7. The vehicle of claim 1, wherein the processor is further configured to:
determine that the vehicle access device has moved away from the predefined zone before the first predefined time duration lapses; and
deactivate the notification unit responsive to a determination that the vehicle access device has moved away from the predefined zone.

8. The vehicle of claim 1, wherein the processor is further configured to:
determine that the vehicle access device has moved within the predefined zone before the first predefined time duration lapses; and
deactivate the notification unit responsive to a determination that the vehicle access device has moved within the predefined zone.

9. The vehicle of claim 1, wherein the detection unit comprises vehicle exterior lights or a vehicle audio system.

10. A method to control operation of a rear closure of a vehicle, the method comprising:
determining, by a processor, that a vehicle access device has entered a predefined zone in proximity to a vehicle rear portion based on inputs obtained from a vehicle detection unit;
activating, by the processor, a vehicle notification unit to output a first set of notifications for a first predefined time duration and at a first frequency responsive to a determination that the vehicle access device has entered the predefined zone;
determining, by the processor, a time duration the vehicle access device is present in the predefined zone;
determining, by the processor, that the time duration is greater than the first predefined time duration;
activating, by the processor, the notification unit to output a second set of notifications at a second frequency for a second predefined time duration responsive to the determination that the time duration is greater than the first predefined time duration, the second predefined time duration including a third predefined time duration after the first predefined time duration lapses; and
causing, by the processor, the rear closure to move from a closed state to an open state responsive to a determination that the second predefined time duration has lapsed.

11. The method of claim 10 further comprising determining that a predefined vehicle condition is met, wherein the activating the vehicle notification unit to output the first set of notifications comprises activating the vehicle notification unit to output the first set of notifications when the predefined vehicle condition is met.

12. The method of claim 11, wherein the predefined vehicle condition comprises at least one of: a vehicle being parked, vehicle movement being less than a predefined movement threshold, the rear closure being in the closed state, the vehicle being in locked state, a vehicle battery state of charge being greater than a predefined battery level threshold and an automatic rear closure control mode being enabled.

13. The method of claim 10, wherein the predefined zone is disposed at a predefined distance away from the vehicle rear portion.

14. A non-transitory computer-readable storage medium having instructions stored thereupon which, when executed by a processor, cause the processor to:
transmit a first low frequency message to a vehicle access device;
receive an authentication message from the vehicle access device, responsive to transmitting the first low frequency message;
authenticate the vehicle access device based on the authentication message;
transmit a second low frequency message to the vehicle access device at a third frequency, responsive to authenticating the vehicle access device;
receive a Received Signal Strength Indicator (RSSI) value from the vehicle access device;
detect a position of the vehicle access device based on the RSSI value;
determine that the vehicle access device has entered a predefined zone in proximity to a vehicle rear portion based on inputs obtained from a vehicle detection unit;
activate a vehicle notification unit to output a first set of notifications for a first predefined time duration responsive to a determination that the vehicle access device has entered the predefined zone;
determine a time duration the vehicle access device stays in the predefined zone;
determine that the time duration is greater than the first predefined time duration; and
cause a vehicle rear closure to move from a closed state to an open state responsive to the determination that the time duration is greater than the first predefined time duration.

* * * * *